No. 801,727. PATENTED OCT. 10, 1905.
W. H. LINDSAY & H. R. COUPER.
COIL FRICTION CLUTCH.
APPLICATION FILED AUG. 26, 1904.
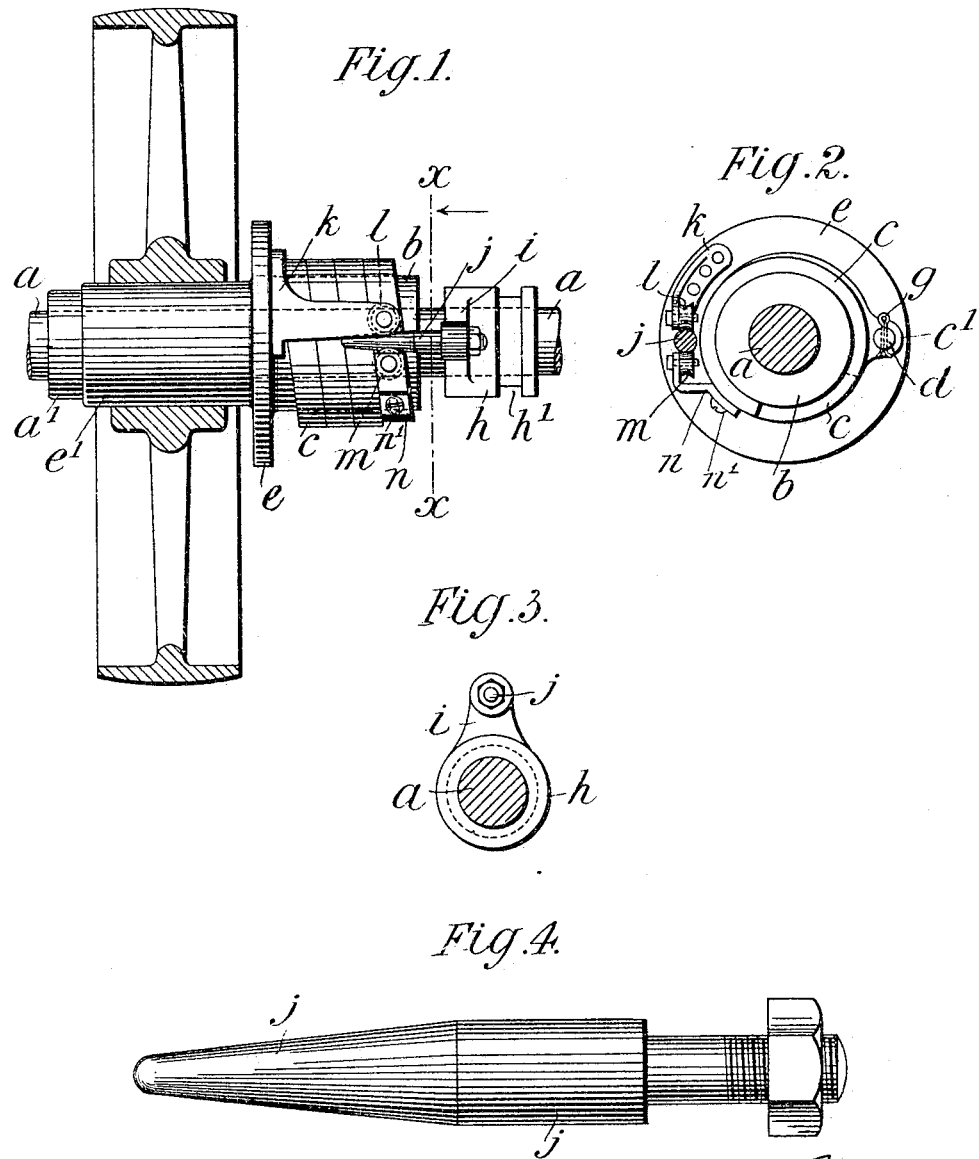

UNITED STATES PATENT OFFICE.

WILLIAM HENRY LINDSAY AND HADEN RICHARDSON COUPER, OF JOHNSTONE, SCOTLAND.

COIL FRICTION-CLUTCH.

No. 801,727.      Specification of Letters Patent.      Patented Oct. 10, 1905.

Application filed August 26, 1904. Serial No. 222,323.

*To all whom it may concern:*

Be it known that we, WILLIAM HENRY LINDSAY and HADEN RICHARDSON COUPER, subjects of the King of Great Britain and Ireland, residing at Johnstone, in the county of Renfrew, Scotland, have invented certain new and useful Improvements in Coil Friction-Clutches; and we do hereby declare the following to be a full, clear, and exact description of the invention, such as will enable others skilled in the art to which it appertains to make and use the same.

This invention consists in an improved coil friction-clutch which is specially adapted for use with machine-tools and for driving pulleys on line-shafting.

In the accompanying drawings, Figure 1 represents the clutch in elevation. Fig. 2 is an end view, partly sectional, on the line $x$ $x$, Fig. 1, looking in the direction of the arrow. Fig. 3 is an end view of the sliding collar for putting the clutch into and out of action. Fig. 4 is an enlarged view of the pin whereby, as hereinafter set forth, coil friction is set up on the drum of the clutch.

Keyed on the driving-shaft $a$ is a drum $b$ with the coil $c$ wound round it. Normally—that is to say, when the clutch is not in gear—the coil $c$ is loose upon the drum $b$, which then rotates within it. The coil $c$ has at the head thereof a lug $c'$, which fits over a pin $d$, fixed in the driving-plate $e$. The driving-plate $e$ has a sleeve $e'$, which is loose upon the shaft $a$. Keyed on the sleeve $e'$, which is held in place by the collar $a'$, fixed on the shaft $a$, is a pulley $f$. A split pin $g$ passed through the pin $d$ prevents the lug $c'$ of the coil $c$ from coming off the pin $d$. While the coil $c$ is loose about the drum $b$ the coil remains stationary and also the driving-plate $e$, to which, as aforesaid, the coil $c$ is connected. When the clutch is put into gear by tightening the coil $c$ to bind on the drum $b$, the coil $c$, driving-plate $e$, sleeve $e'$, and pulley $f$ rotate with the shaft $a$. Tightening of the coil $c$ to bind on the drum $b$ is effected by end pressure exerted at the tail of the coil.

On the shaft $a$ is a collar $h$, which can be slid along the shaft by means of a forked lever engaging with the neck $h'$ or by any other suitable means. The collar $h$ has an outstanding arm $i$, to which is secured a pin $j$, a part of the body of which is cylindrical and a part is conical, as seen more particularly at Fig. 4. Carried in a bracket $k$, which is fixed to the driving-plate $e$, is a roller $l$. A similar roller $m$ is supported in a bracket $n$, which is fixed to the coil $c$ near the tail thereof. When, as shown at Fig. 1, the pin $j$ is by sliding the collar $h$ toward the coil $c$ thrust between the rollers $l$ and $m$ and bears against them, the coil $c$ is tightened on the drum $b$. Coil friction is thus set up, putting the clutch into action.

When the cylindrical part of the body of the pin $j$ is between the rollers $l$ and $m$, the pin will remain there, maintaining the clutch in gear without requiring end pressure to be kept up for that purpose.

By withdrawing the pin $j$ from contact with the rollers $l$ and $m$ the bind of the coil $c$ on the drum $b$ is relaxed, and the clutch is thus put out of action.

The bracket $n$ is adjustable about the coil $c$, the pin $n'$, by which the bracket is held, being passed into a slot in the bracket. When, owing to wear, the coil $c$ does not bind sufficiently tightly on the drum $b$, the pin $n'$ is loosened, and after the bracket $n$ has been moved to the necessary extent toward the bracket $k$ the bracket $n$ is reclamped to the coil $c$.

In event of the clutch being driven backward, owing to overrunning of machinery or other cause, the bracket $k$ will act as a stop, preventing unwinding or distortion of the coil.

What we claim is—

1. In a friction-clutch, the combination with shafting, of a rotary support loosely mounted thereon, a clutch member keyed to said shafting adjacent said rotary support, a second clutch member comprising a coil encircling said first clutch member and having its inner end secured to said rotary support, a projection on the free end of said coil, a projection carried by said rotary support and disposed opposite said first projection, a longitudinally-operative wedge member disposed between said projections, and means for operating said wedge member.

2. In a friction-clutch, the combination with shafting, of a disk carried thereby, a clutch member keyed to said shafting adjacent said disk, a clutch member comprising a coil encircling said other clutch member and having its inner end secured to said disk, a bracket carried by said disk and extending across said coil member, oppositely-disposed projections carried by said bracket and coil member, and means for throwing said clutch members into clutch comprising a longitudinally-operative wedge adapted to be thrust between said projections, and means for operating said wedge.

3. In a friction-clutch, the combination with shafting, of a disk carried thereby, a clutch member keyed to said shafting adjacent said disk, a clutch member comprising a coil encircling said other clutch member and having its inner end secured to said disk, a bracket carried by said disk and extending across said coil member, oppositely-disposed grooved projections carried by said bracket and coil member having their grooved faces in substantial alinement, and means for throwing said clutch members into clutch, comprising a conical pin operative between said grooved projections, and means for operating said pin.

4. In a friction-clutch, the combination with shafting, of a disk carried thereby, a clutch member keyed to said shafting adjacent said disk, a clutch member comprising a coil encircling said other clutch member and having its inner end secured to said disk, a bracket carried by said disk and extending across said coil member, oppositely-disposed grooved projections carried by said bracket and coil member having their grooved faces in substantial alinement and means for throwing said clutch members into clutch, comprising a conical pin, having a cylindrical shank, operative between said grooved projections, and means for operating said pin.

5. In a friction-clutch, the combination with shafting, of a disk carried thereby, a clutch member keyed to said shafting adjacent said disk, a clutch member comprising a coil encircling said other clutch member and having its inner end secured to said disk, a bracket carried by said disk and extending across said coil member, opposed grooved rollers revolubly supported on said bracket and said coil member, having their peripheral grooved surfaces in substantial alinement, and means for throwing said clutch members into clutch, comprising a conical pin operative between said grooved rollers, and means for operating said pin.

6. In a friction-clutch, the combination with shafting, of a disk carried thereby, a clutch member keyed to said shafting adjacent said disk, a clutch member comprising a coil encircling said other clutch member and having its inner end secured to said disk, a bracket carried by said disk and extending across said coil member, opposed grooved rollers revolubly supported on said bracket and said coil member, having their peripheral grooved surfaces in substantial alinement, and means for throwing said clutch members into clutch, comprising a conical pin, having a cylindrical shank, operative between said grooved rollers, and means for operating said pin.

7. In a friction-clutch, the combination with shafting, of a disk carried thereby, a clutch member keyed to said shafting adjacent said disk, a clutch member comprising a coil encircling said other clutch member and having its inner end secured to said disk, a bracket carried by said disk and extending across said coil member, a grooved roller mounted on the inner face of said bracket, a bracket adjustably supported on the tail end of said coil member, a grooved roller carried by said adjustable bracket and having its peripheral surface in substantial alinement with said other roller, means for throwing said clutch members into clutch comprising a wedge-pin operative between said rollers, and means for operating said pin.

8. In a friction-clutch, the combination with a shaft, of a sleeve provided with a disk loosely journaled thereon, a clutch member keyed to said shaft adjacent said disk, a second clutch member comprising a coil encircling said other clutch member and secured at one end to said disk, a bracket carried by said disk and extending across said coil member, projections carried by said bracket and said coil member having opposed adjacent faces, and means for throwing said clutch members into clutch, comprising a wedge member operative between said projections, a collar operative along said shaft and supporting said wedge-pin, and means for operating said collar.

In testimony whereof we affix our signatures in presence of two witnesses.

WILLIAM HENRY LINDSAY.
HADEN RICHARDSON COUPER.

Witnesses:
JNO. McFADZAN,
JOHN W. McCOLL.